United States Patent
Giri et al.

(10) Patent No.: US 9,297,310 B2
(45) Date of Patent: Mar. 29, 2016

(54) PART LOAD PERFORMANCE IMPROVEMENT USING DEFORMABLE BORE PLUGS

(71) Applicant: GENERAL ELECTRIC COMPANY, Schenectady, NY (US)

(72) Inventors: Sheo Narain Giri, Karnataka (IN); Sanjeev Kumar Jha, Karnataka (IN); Bhaskar Pemmi, Karnataka (IN); Harish Bommanakatte, Karnataka (IN); Santhosh Donkada, Karnataka (IN); Krishna Kishore Gumpina, Karnataka (IN); Indrajit Mazumder, Karnataka (IN); Rajarshi Saha, Karnataka (IN)

(73) Assignee: General Electric Company, Schenectady, NY (US)

( * ) Notice: Subject to any disclaimer, the term of this patent is extended or adjusted under 35 U.S.C. 154(b) by 988 days.

(21) Appl. No.: 13/654,818

(22) Filed: Oct. 18, 2012

(65) Prior Publication Data

US 2014/0109580 A1    Apr. 24, 2014

(51) Int. Cl.
*F02C 7/12*    (2006.01)
*F02C 9/18*    (2006.01)
*F01D 25/08*    (2006.01)
(Continued)

(52) U.S. Cl.
CPC . *F02C 7/12* (2013.01); *F01D 5/082* (2013.01); *F01D 25/14* (2013.01); *F02C 6/08* (2013.01); *F02C 9/18* (2013.01); *F01D 25/08* (2013.01); *F05D 2300/505* (2013.01)

(58) Field of Classification Search
CPC ........... F02C 6/08; F02C 7/12; F02C 7/18; F02C 9/18; F05D 2260/20; F05D 2270/303; F05D 2270/3032; F01D 17/12; F01D 17/14; F01D 17/143; F01D 25/08; F01D 25/12; F01D 25/14

See application file for complete search history.

(56) References Cited

U.S. PATENT DOCUMENTS 4,296,599 A  *  10/1981  Adamson .................. 60/39.23
6,425,553 B1      7/2002  Smith et al.
(Continued)

FOREIGN PATENT DOCUMENTS

EP        2116621 A2    11/2009
EP        2679771 A1     1/2014
(Continued)

OTHER PUBLICATIONS

EP Search Report and Written Opinion dated Feb. 6, 2014, issued in connection with corresponding EP Application No. 13188184.9.

*Primary Examiner* — Andrew Nguyen
(74) *Attorney, Agent, or Firm* — McNees Wallace & Nurick LLC

(57) ABSTRACT

A cooling arrangement for a gas turbine engine. The cooling arrangement comprises a discharge channel for air flow from a compressor, a first cooling channel and at least one aperture providing communication between the flow of air through the discharge channel and the first cooling channel. A restrictor device in the aperture regulates the flow of air between the discharge channel and the first cooling channel. The restrictor device deforms to vary air flowing through the aperture in response to a physical condition of the engine. This physical condition of the engine may be that of the temperature of air flowing through the discharge channel, the restrictor device responding to regulate the flow of air based on that temperature. The restrictor device may be a two-way shape memory alloy.

11 Claims, 7 Drawing Sheets

(51) Int. Cl.
  *F02C 6/08* (2006.01)
  *F01D 25/14* (2006.01)
  *F01D 5/08* (2006.01)

(56) References Cited

U.S. PATENT DOCUMENTS

| | | |
|---|---|---|
| 6,485,225 B1 | 11/2002 | Baker |
| 6,485,255 B1 * | 11/2002 | Care ........................ F01D 5/187 |
| | | 415/12 |
| 7,775,052 B2 | 8/2010 | Cornwell et al. |

| | | | |
|---|---|---|---|
| 2009/0056307 A1 * | 3/2009 | Mons ........................... | 60/226.3 |
| 2009/0226327 A1 | 9/2009 | Little et al. | |
| 2010/0163772 A1 | 7/2010 | Arnett | |
| 2010/0303616 A1 * | 12/2010 | Chir et al. ..................... | 415/178 |
| 2011/0162384 A1 * | 7/2011 | Langdon et al. ................ | 60/782 |
| 2011/0233434 A1 | 9/2011 | Webster | |
| 2012/0128473 A1 | 5/2012 | Szwedowicz et al. | |

FOREIGN PATENT DOCUMENTS

| | | |
|---|---|---|
| FR | 2916475 A1 | 11/2008 |
| GB | 2470253 A | 11/2010 |

* cited by examiner

PART LOAD PERFORMANCE IMPROVEMENT USING DEFORMABLE BORE PLUGS

FIELD OF THE INVENTION

The present invention is directed generally to the use of shape memory alloys in gas turbine engine components, and specifically to the use of shape memory alloys to control cooling of turbine engine components with changing temperature.

BACKGROUND OF THE INVENTION

Gas turbine engines operate by burning fuel and extracting energy from the combusted fuel to generate power. Atmospheric air is drawn into the engine from the environment, where it is compressed in multiple stages to significantly higher pressure and higher temperature. A portion of the compressed air is then mixed with fuel and ignited in the combustor to produce high energy combustion gases. The high energy combustion gases then flow through the turbine section of the engine, which includes a plurality of turbine stages, each stage comprising turbine vanes and turbine blades mounted on a rotor. The high energy combustion gases create a harsh environment, causing oxidation, erosion and corrosion of downstream hardware. The turbine blades extract energy from the high energy combustion gases and turn the turbine shaft on which the rotor is mounted. The shaft may produce mechanical power or may directly generate electricity. A portion of the compressed air is also used to cool components of the turbine engine downstream of the compressor, such as combustor components, turbine components and exhaust components.

In some gas turbine engines, the compressor discharge casing is a complex cast iron structure that locates the combustion hardware (e.g. fuel nozzle, combustion liner and transition pieces) between the compressor exit and the turbine inlet. Air from the compressor is a permitted to leak around the compressor discharge casing to cool the region in front of the first rotor and turbine blade set mounted on the rotor, also referred to as the first forward wheelspace (1FWSP). Of course, the amount of cooling air is determined based on the pressure of the compressor discharge air, which can vary at fixed load conditions based on ambient air temperature. To provide additional cooling, boreplugs are provided in the compressor discharge casing that permits additional compressor discharge air to flow into 1FWSP to provide additional cooling. The number of boreplugs to be opened is based on anticipated cooling flow requirements. If the anticipated cooling flow is incorrect, then cooling either will be inadequate, causing the temperatures in the 1FWSP to be too high, which can result in shortened life expectancy of the components being cooled, or will be excessive, resulting in the unnecessary diversion of compressor air that can result in operational inefficiency. Of course, because the boreplugs are opened or removed on installation based on anticipated cooling flow, correction of the cooling flow by addition or removal of plugs must await maintenance, as removal of a gas turbine from service to accomplish this modification is not cost effective.

Due to rising fuel costs, natural gas fired power plants that were designed to operate at mostly full power output are now being operated on a intermittent basis. Coal and nuclear energy now generally make up the majority of stable power output. Gas turbines are being increasingly used to make up the difference during peak demand periods. For example, a gas turbine may be used only during the daytime and then taken off line during the night time when the power demand is lower. During load reductions or "turndowns", gas turbines typically can remain in emissions compliance down to about forty to forty-five percent (40% to 45%) of full rated load output. Below this load, carbon monoxide (CO) emissions can increase exponentially and cause the system as a whole to go out of emissions compliance. Generally described, emissions compliance requires that the turbine as a whole to produce less than the guaranteed or predetermined minimum emissions levels. Such levels may vary with the ambient temperature, system size, and other variables. Especially the turndown capability of the gas turbine goes down in cold ambient, i.e. as the ambient temperature falls, the minimum load for CO compliance rises steeply. If a gas turbine has to be shutdown because it cannot remain in emissions compliance due to a low power demand, the other equipment in a combined cycle application also may need to be taken offline. This equipment may include a heat recovery steam generator, a steam turbine, and other devices. Bringing these other systems online again after a gas turbine shutdown may be expensive and time consuming. Such startup requirements may prevent a power plant from being available to produce power when the demand is high. There may be a strategic operational advantage in being able to keep a gas turbine online and in emissions compliance during periods of low power demand so as to avoid the start up time and expense. The above defined minimum load is a function of combustion temperature. If the combustion temperature drops down below a predetermined value, the CO emission increases. This temperature is a function of fuel air ratio in the combustor. So during gas turbine load reduction the fuel and air flow has to be reduced proportionately to maintain required combustion temperature. Current gas turbine design have several limitation on minimum allowable air flow to the combustor below a predetermined gas turbine load which impacts the fuel air ratio also the combustion temperature and increases the emission at lower gas turbine load. There is a desire therefore for methods to minimize the air flow to the combustor further as function of fuel flow at lower loads and extending gas turbine emissions compliance during periods of reduced loads.

Shape memory alloys (SMA), sometimes referred to as smart materials, have the ability to change shape based on microstructure and composition. SMAs take advantage of the transition of the microstructure from a low temperature martensitic structure to a high temperature austenitic structure (and back) in a predictable manner. The SMAs may provide the ability to regulate the airflow through boreplugs by opening, closing (or partially opening) the bore apertures thereby increasing or decreasing airflow. And while one well-known SMA, nitinol, or NiTi having roughly an equal atomic percentage of Ni and Ti, is unsuitable for use as a boreplug opening due to the high temperatures experienced in the operation in a gas turbine engine, other SMAs having the ability to survive high temperatures of operation as well as the corrosive, oxidative environment of a gas turbine engine may be suitable. Thus, a shape memory alloy suitable for use in the high temperature, oxidative and corrosive environment of a gas turbine engine may find use as a component for the regulation of cooling flow based on changing operational conditions.

SUMMARY OF THE INVENTION

A cooling arrangement for a gas turbine engine is set forth. The gas turbine engine comprises a compressor for compressing air, a combustor for combusting fuel with compressed air and a turbine for generating power. A discharge channel from the compressor directs compressed air from the compressor downstream for use in the combustor and for cooling hot sections of the engine such as portions of the combustor and the turbine. One of the cooling apparatus of the engine is a cooling channel that provides cooling for cooling flow to turbine buckets. Cooling air for the cooling channel is provided from the discharge channel. A compressor discharge case forms a boundary between the cooling channel and the discharge channel to prevent unrestricted flow of air between the cooling channel and the discharge channel. Flow between the discharge channel and the cooling channel is restricted by at least one aperture in the compressor discharge case, which provides communication between the flow of air through the discharge channel and the first cooling channel. A restrictor device within the at least one aperture further regulates the flow of air between the discharge channel and the cooling channel in response to a physical condition of the gas turbine engine. The restrictor device is positioned in the at least one aperture. The restrictor device deforms in response to at least one of a temperature of the air flowing through the discharge channel and a power output of the gas turbine engine, thereby regulating the opening for air flow through the at least one aperture.

The cooling arrangement comprises a flow of air through a discharge channel, a first cooling channel and at least one aperture or borehole through the compressor discharge case providing communication between the flow of air through the discharge channel and the first cooling channel. A restrictor device is placed within the at least one aperture to regulate the flow of air between the discharge channel and the first cooling channel. The restrictor device deforms in response to a physical condition of the gas turbine engine. The physical condition may be a temperature of the air flowing through the discharge channel, the temperature in or adjacent to the cooling channel reflective of the area to be cooled or a power output of the gas turbine engine. The deformation of the restrictor device in or across the borehole regulates the opening through the at least one aperture, which controls the air flow between the discharge channel and the first cooling channel.

The modulation of airflow by reducing the flow of air from the discharge channel and through the cooling channel when it is not needed will change the air pressure across bucket segments. This change in air pressure across the bucket shanks should assist in reducing cross shank leakage. In addition, by restricting the flow of air through cooling channels when it is not needed, more air will be available to support combustion to manage both CO and $NO_x$ levels, particularly during turndown. Control of CO and $NO_x$ are critical in controlling of emissions from gas turbines.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
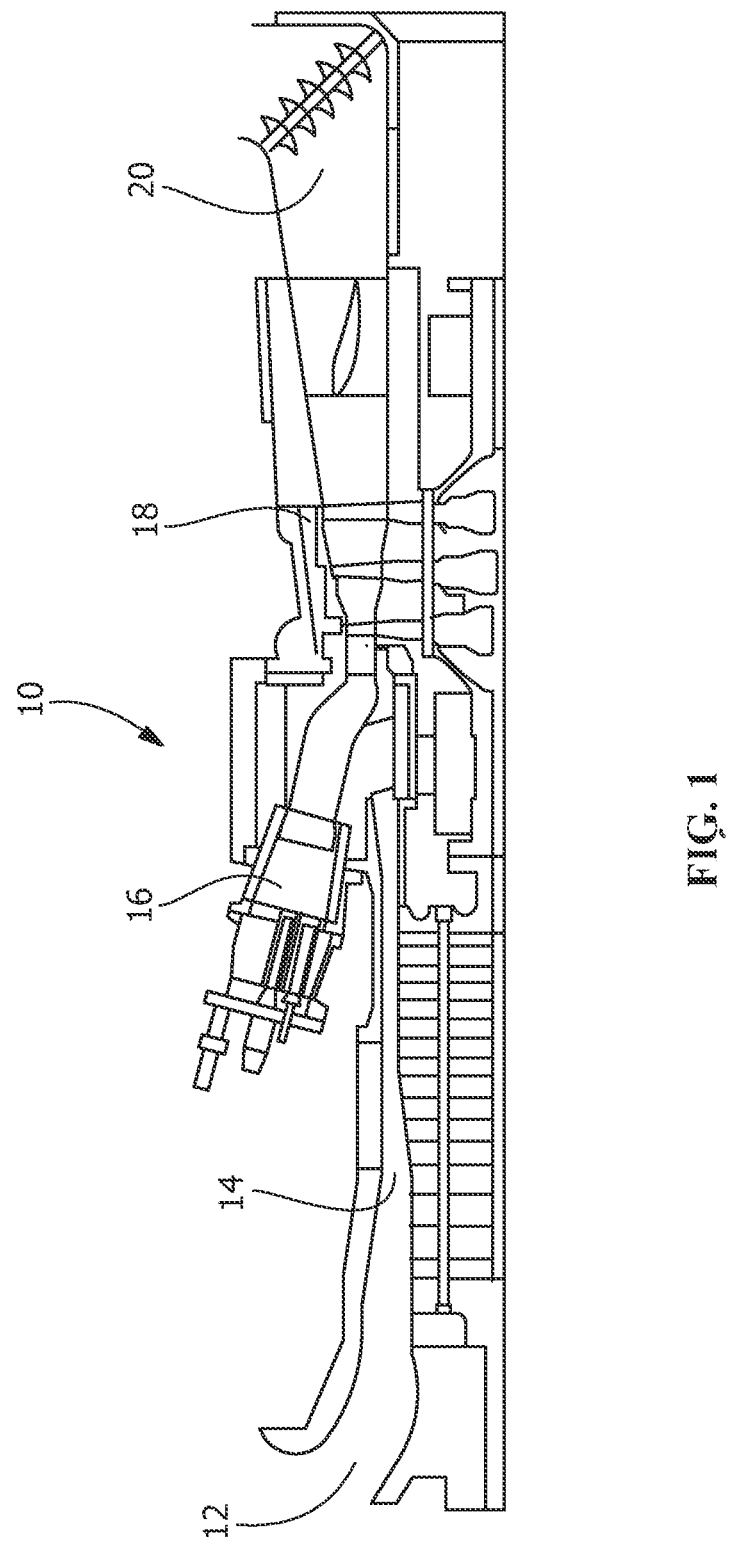
FIG. 1 is a cross-section of a gas turbine engine utilizing a compressor discharge case.

The present invention utilizes the unique properties of SMAs to provide cooling based on temperature. SMAs are characterized by temperature-dependent phase changes, the phases generally being a low temperature martensitic phase and an elevated austenitic phase. While SMAs can exhibit one-way shape memory, two way shape memory of SMAs makes cooling modulation possible. Two way shape memory is characterized by a shape transition both upon heating from the martensitic phase to the austenitic phase, as well as upon cooling from the austenitic phase to the martensitic phase. Two way shape memory may be either extrinsic or intrinsic. Intrinsic behavior is induced in SMAs through processing, which includes deformation of the SMA material while in the martensitic phase, followed by multiple heating and cooling cycles through the transformation temperature range under constraint. Once processing is complete, shape changes between the low temperature state and the high temperature state is reversible. Extrinsic behavior combines a SMA that exhibits one way behavior with another element that provides a restoring force that recovers the shape after the one way deformation.

Nitinol, Ni—Ti alloys having approximately equal atomic percentages of nickel and titanium, are well known SMAs. However, nitinol is not suitable in oxidizing, corrosive environments and the transformation temperatures of martensite to austenite is relatively low, the temperatures occurring over a range extending up to about 100° C. However, other suitable SMAs having higher temperature capabilities include alloys having compositions selected from the group consisting of Ni, Al, Nb, Ti, Ta and combinations thereof and platinum group metals selected from the group consisting of Pt, Pd, Rh, Ru, Ir and combinations thereof. More specifically, suitable shape memory alloy compositions may include nickel aluminum based alloys such as nickel aluminum alloys including a platinum group metal (PGM). Because the behavior of the SMA is very dependent on alloy composition, small changes in composition and/or processing can be used to alter transformation temperature, strain hysteresis, actuation force, yield strength, damping ability, resistance to oxidation, hot corrosion, ability to actuate through repeated cycles, capability to exhibit two way shape memory effect among other engineering attributes. More specifically, the SMA alloy compositions may include alloys having the formula $(A_{1-x} PGM_x)_{0.5+y}B_{0.5-y}$, where A is selected from the group consisting of Ni, Co, Fe and combinations thereof; PGM is selected from the group consisting of Pt, Pd, Rh, Ru, Ir and combinations thereof and B is selected from the group consisting of Al, Cr, Hf, Zr, La, Y, Ce, Ti, Mo, W, Nb, Re, Ta, V and combinations thereof x is greater than 0, y is from 0 to about 0.23. The SMA alloy may additionally include up to about 1 atomic % of C or B.

Thus, it is clear that the behavior of SMAs is well-known, and the behavior of SMAs can be varied to achieve two way shape memory behavior by modifying the composition of the alloy to exhibit two way shape memory at various temperatures. Furthermore, the SMA alloy composition can be modified to also provide oxidation resistance and corrosion resistance.

Referring now to FIG. 1, which is a cross section of a gas turbine engine 10, depicting the fan portion 12 of the engine, the compressor portion 14 of the engine, the combustor portion 16 of the engine, the turbine portion 18 of the engine and the exhaust portion 20 of the engine. Air from the environment is inlet through fan portion 12 and directed to compressor portion 14 where it is compressed to high pressures, the temperature of the air also being elevated by the compression process. Compressed air from compressor portion is then used for combusting fuel, but also may be used for other purposes such as active or passive cooling of various components in the engine. Compressed air is mixed with fuel in combustor portion 16 where the fuel is ignited and burned. The hot gases of combustion, being energetic, travel at high velocity to turbine portion 18, where energy is extracted the energy being converted to electrical energy or mechanical energy. A portion of the energy extracted by the turbine is utilized to turn compressor portion 14 and fan portion 12. The less energetic exhaust gases are then exhausted through exhaust portion 20 as exhaust gases which may be treated before being returned to the environment.

Figure 2:
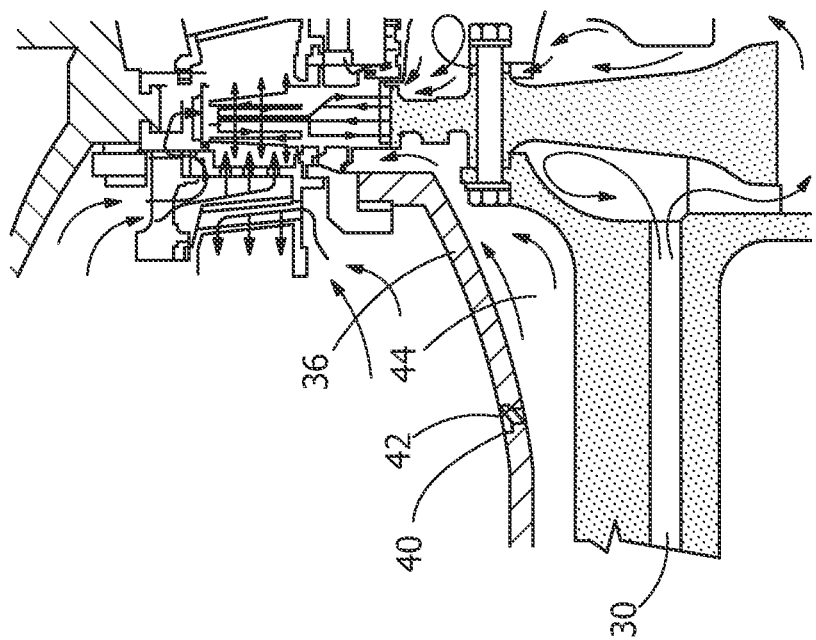
FIG. 2 is a cross section of a compressor discharge case showing the path for cooling air for the 1FWSP location.

FIG. 2 represents a cross-section of compressor portion 14 of gas turbine engine of FIG. 1. Some compressor air is channeled through passageway 30, where it cools rotor 32 and turbine blades 34 mounted on rotor 32. The amount of cooling air required will depend on a number of factors, including ambient air temperature and the pressure of the compressor discharge air. Because ambient air temperature can vary significantly, depending upon the location of the gas turbine, by 110° F. or more, provisions are normally provided to increase cooling air volume at higher operating temperatures.

FIG. 2 shows the flow of compressor discharge air as it is funneled by compressor discharge case to the next stage of gas turbine 10. Compressor discharge case includes a plurality of boreholes 40. These boreholes 40 may be filled with boreplugs 42. Prior art designs utilize boreplugs 42 to selectively fill boreholes 40 based on anticipated cooling flow requirements, each borehole providing additional cooling flow. The number of boreholes 40 with or without boreplugs 42 is dependent on the anticipated cooling flow requirements, more anticipated cooling requiring the removal of more boreplugs.

Figure 3:
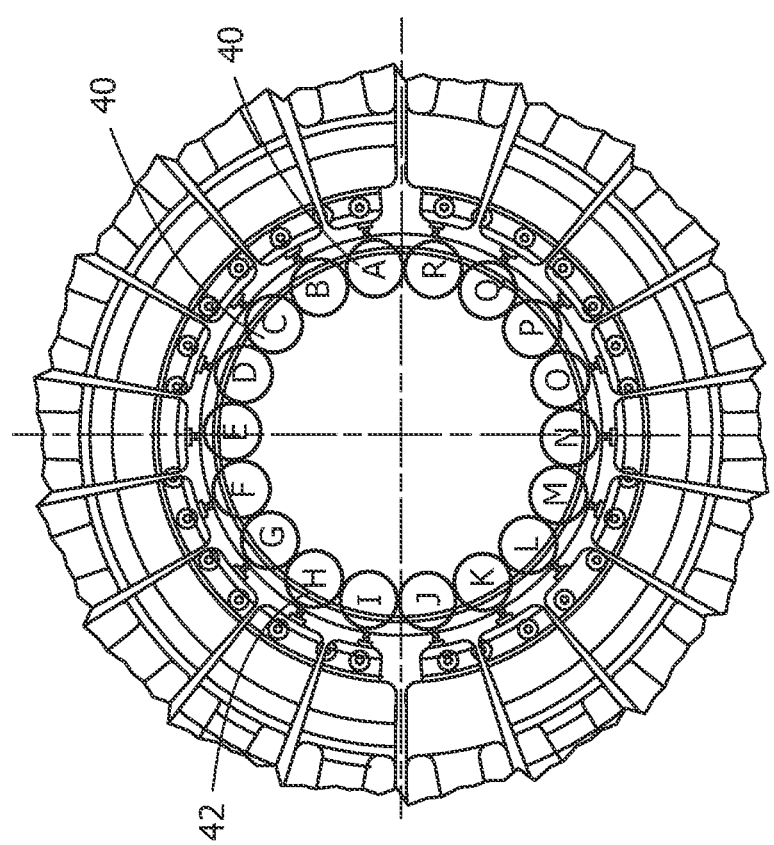
FIG. 3 is a perspective view of the compressor discharge case of FIG. 2 having 18 boreplugs.

Cooling flow is channeled through boreholes 40 into second channel 44 where additional cooling air is permitted to flow to permit additional cooling to rotor 32 and to turbine blades 34 mounted on rotor 32. Unlike the prior art, which anticipated cooling flow requirements at gas turbine installation or during maintenance, the design of FIG. 2 includes a plurality of boreholes 40, each of boreholes 40 including a restrictor device positioned within borehole 40 to control the flow of air between the discharge panel and the first cooling channel. The restrictor device may be a boreplug 42. FIG. 3 depicts such a casing showing 18 boreholes 40, each with a boreplug 42.

Boreplugs 42 of the present invention may be installed in all boreholes 40 or only in a predetermined number of boreholes 40. The actual number of apertures or boreholes and boreplugs will depend on the gas turbine design. Boreplugs 42 comprise a shape memory alloy (SMA), the SMA selected based on its ability to respond to changes in temperature by change of shape due to changes in microstructure, for example, austenite to martensite and vice versa. By careful selection of composition and heat treatment, the SMA material can respond to changes in temperature. The selection of composition and heat treatment to obtain the requisite behavior is referred to as "training." As the temperature of compressor discharge air changes, boreplugs 42 comprising SMA undergo a modification in shape, thereby increasing, reducing or stopping the flow of air through boreholes 40. The ability of boreplugs 42 to change shape to increase or reduce the flow of air through boreholes based on an increase or decrease in temperature respectively means that the SMA exhibits bidirectional behavior, and the SMA is bidirectional. Typically, the SMA assumes a first shape in their martensitic condition. On reaching a predetermined temperature, depending upon alloy composition and heat treat condition, the SMA will convert to an austenitic condition. On transforming to its austenitic condition, the SMA assumes a different shape.

Figure 4:
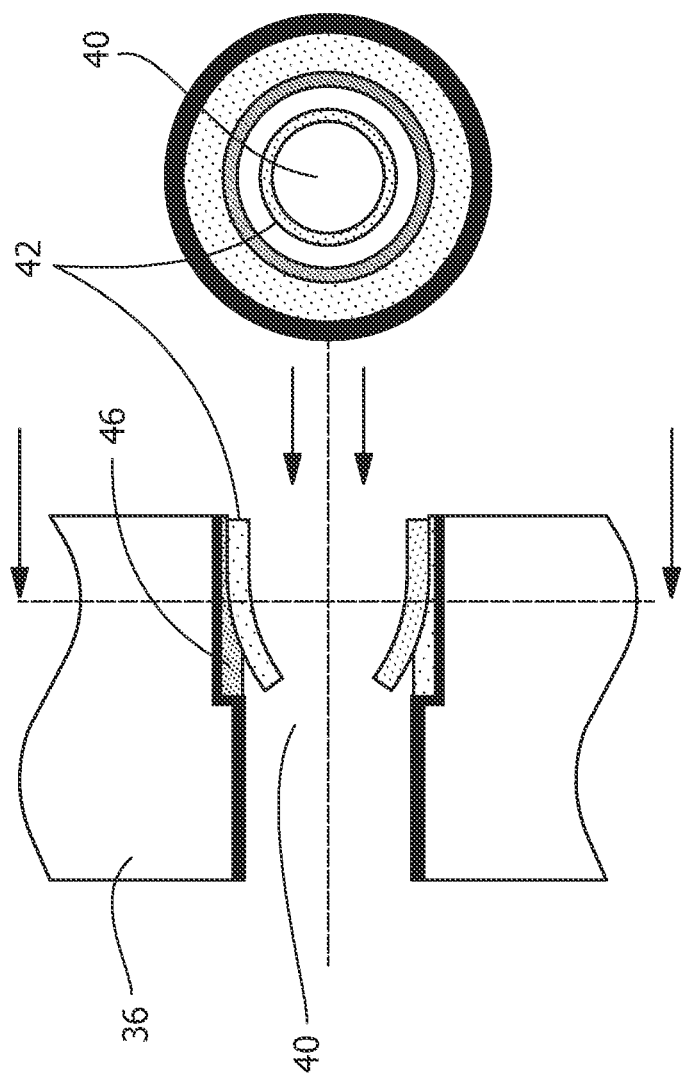
FIG. 4 depicts a cross section of a bore hole of FIG. 2 showing a SMA boreplug at two different temperatures.
Figure 5:
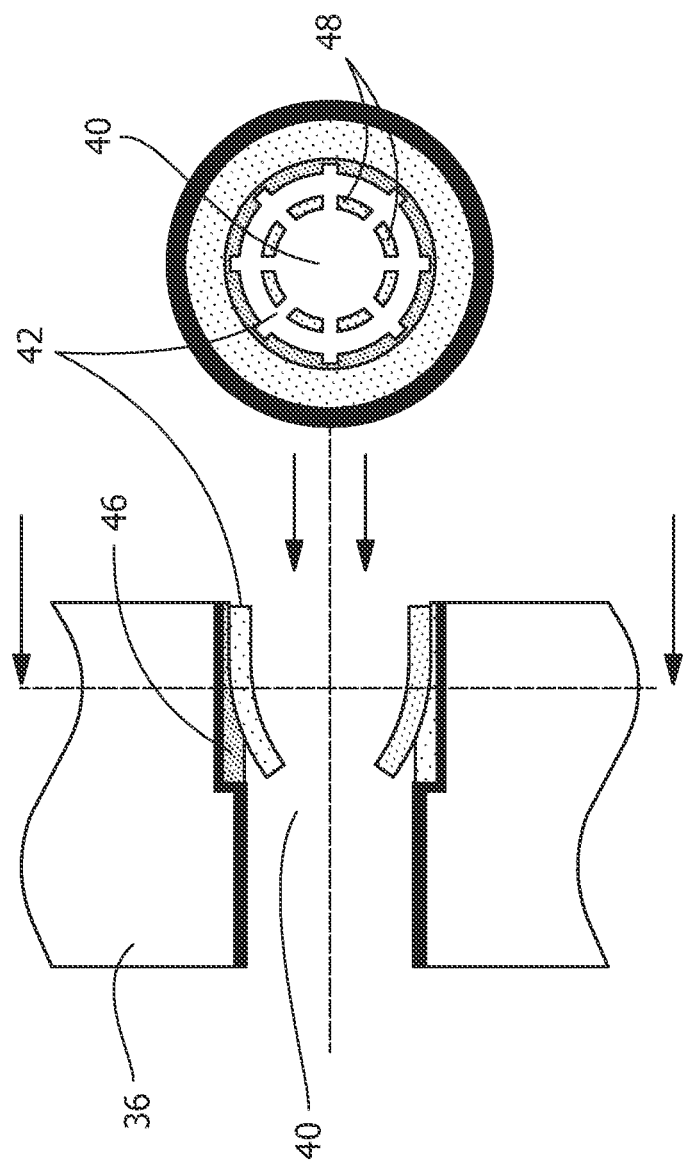
FIG. 5 depicts a cross section of a bore hole of FIG. 2 showing a second embodiment of a SMA boreplug at two different temperatures.

In a simple example, referring again to FIG. 3 as well as to FIGS. 4 and 5, when ambient temperatures are low and pressure of compressor discharge air is also low, the temperature range of the compressor discharge air being known, there is no need for additional cooling air to flow through boreholes 40 into channel 44. Within this temperature range, the SMA material comprising boreplugs 42 are selected so that boreholes 40 are closed by boreplugs 42 and remain closed within this temperature range. Thus, compressor flow can be directed through compressor discharge case without diversion into channel 44, as additional cooling is not needed. As compressor discharge air increases, due to increased turbine demand and higher ambient temperatures, there is a need for increased air flow to cool the region referred to as first forward wheelspace (1FWSP), since air flowing in passageway 30 is inadequate. The increased temperature of the compressor discharge air flowing over boreplugs 42, of course, raises the temperature of boreplugs 42. The SMA material comprising the boreplugs are preselected to change shape as the temperature of the compressor discharge air reaches a predetermined temperature, the change in shape of the SMA material opening the boreholes 40 to allow compressor discharge air to pass through boreholes 40 and into channel 40.

FIGS. 3-5 represent the broad embodiment of the present invention. There are a number of possible variations, all within this broad embodiment. Referring to FIG. 3, which discloses 18 boreholes 40, all of the boreplugs 42 in boreholes 40 may comprise the same SMA material composition, so that on reaching a predetermined temperature, all boreplugs change shape identically to change the flow of air from a minimum or zero to a maximum, resulting in maximum airflow through boreholes 40 into channel 44 to provide cooling to 1FWSP.

Alternatively, boreplugs 42 may comprise the same SMA material composition. However, boreplugs 42 may change shape over a range of temperatures, that is, boreplugs may convert from a martensitic condition to an austenitic condition over a range of temperatures. Thus, SMA material may be selected so that it moves a predetermined amount over a range of temperatures, so that the amount of air passing through boreholes 40 into channel 44 is modulated over the temperature range. This allows the amount of air admitted into channel 44 to increase as the temperature of the compressor discharge air is increased.

Because SMA materials are very sensitive to temperature, and can be trained to change shape on achieving a predetermined temperature. Yet another embodiment utilizes a different SMA material for boreplugs 42 in boreholes 40. A plurality of boreplugs 42 of the same SMA material may be utilized in a plurality of boreholes 40, as illustrated in FIG. 4 in which boreplug 42 is cylindrically shaped. It is within the scope of this invention to utilize a different SMA material composition for a boreplug 42 in each of boreholes 40. Because SMA materials can be trained to change shape with changing temperature, different compositions or heat treat conditions of SMA materials can be selected for use in boreholes so that they change shape at different temperatures, i.e. convert from martensitic condition to austenitic condition at different temperatures. Thus, as the temperature changes in the discharge channel, various boreplug or boreplugs 42 will change shape to modulate air flow through boreholes into channel 44 as needed based on the discharge temperature. A boreplug 42 in individual boreholes may be further comprised of a plurality of segments 48, as illustrated in FIG. 5.

SMA materials can be trained to modulate airflow in a number of ways. Whatever method is used, the modulation should admit more air into channel 44 as additional cooling air is required in the cooling channel with increasing discharge channel air temperature. Thus, boreplug 42 may be in a deformed position at cooler temperatures, blocking borehole 40, and may straighten into an undeformed position at a preselected temperature or temperature range, thereby increasing airflow through borehole 40. Alternatively, boreplug 42 may be in an undeformed position at cooler temperatures, blocking borehole 40, and may deform at a preselected temperature or temperature range, thereby increasing airflow through borehole 40. FIGS. 4 and 5 illustrate a segmented boreplug 42 installed in borehole 40, creating a varying area orifice for regulating cooling flow. In these Figures, segmented boreplug 42 is deformed at cooler temperatures, blocking airflow into borehole 40. As shown in FIGS. 4 and 5, at cooler temperatures, segmented boreplug 42 may be deformed to only partially block airflow through borehole 40. However, it will be understood by those skilled in the art that segmented boreplug 42 may be deformed so as to substantially block borehole 40. As the ambient temperature increases, the SMA material straightens into an undeformed position and occupies counterbore 46 in compressor discharge case 36 so that maximum airflow occurs through borehole 40. As noted above, SMA material may be selected and trained so as to change shape at a preselected temperature or over a preselected temperature range. When selected to change shape over a preselected temperature range, the airflow through borehole 40 will be modulated as the temperature changes within the range. It also will be understood by those skilled in the art with a segmented boreplug 42 having a plurality of segments, each of the segments may be comprised of a different SMA material composition that changes shape at a different preselected temperature, so that each boreplug 42 is self-modulating as temperature changes.

By modulating boreplug flow as a function of temperature, reduction in the amount of air passing into channel 44 will reduce air leakage across the blade shank when air flow into channel 40 is reduced by the shape memory alloys as cooling demands decrease. Modulating secondary airflows may impact air available to the combustor. Unlike the prior art schemes in which airflow was determined on installation, the flow of air for cooling in the present invention is determined modulated by the use of shape memory alloys. Thus, except under those operating conditions in which maximum cooling is required, under most conditions, more air should be available to the combustor which should provide additional flexibility to adjust combustion conditions to further manage $NO_x$, un unexpected additional benefit of air modulation as more air can be provided for control of combustion at part load conditions.

SMA materials, either as a cylindrical plug or as cylindrical segments may be attached to compressor discharge case 36 by brazing, welding or other joining technique. It also may be possible to mechanically lock plug 42 to compressor discharge case, such as by a dovetail arrangement or other keyway/keyhole arrangement that positively locks plug 42 to compressor discharge case 36. The selected technique should not affect the temperature behavior characteristics of the SMA material.

In another embodiment, installed boreplug 42 is installed in counterbore 46 so that little or no air can pass through boreholes 40. As temperature is increased, boreplug 42 undergoes a shape change so that air can pass around boreplug 42, through counterbore 46, into and through borehole 40 and into channel 44. The operation of boreplug 42 in this embodiment once again depends on the shape change characteristics of the SMA with temperature, although the flow path of the cooling air through compressor discharge case, and further illustrates the various ways in which the SMA material can be used to modulate or regulate the flow of air to provide additional cooling as needed as a result of part/full load conditions, ambient air temperature etc.

While the present invention has been described in terms of circular or cylindrical apertures or boreholes 40, and boreplugs 42 having a circular area profile matched to boreholes to provide the desired airflow based on load conditions and/or ambient air conditions, it will be recognized by those skilled in the art that the shape of boreholes and boreplugs is not so restricted, and any geometric shape, including but not limited to rectangular, square, triangular, oval, hexagonal octangular etc. may be used.

Figure 6:
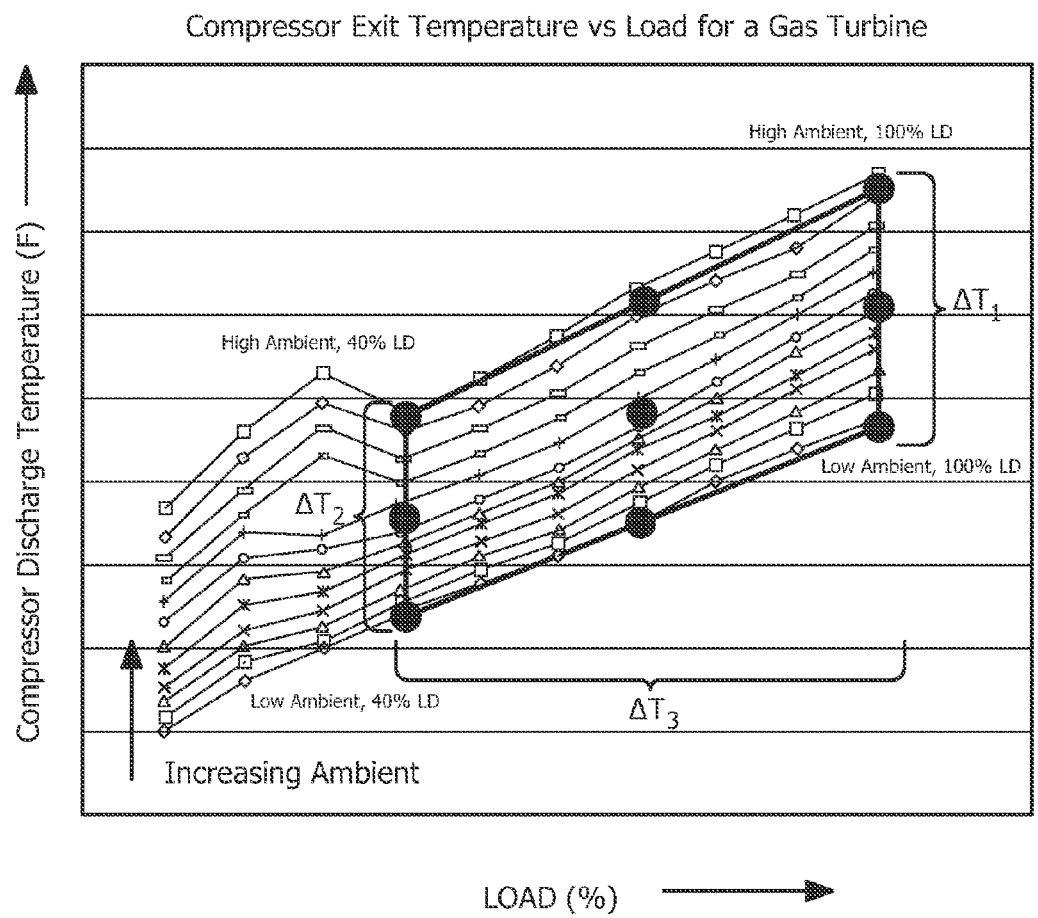
FIG. 6 depicts the SMA operational envelope in a compressor casing.

FIG. 6 depicts load as a function of compressor discharge temperature as well as ambient temperature using active cooling such as the active boreplugs of the present invention. Ambient temperature alone may affect compressor discharge temperature at 1FWSP (where this designates the temperature of the compressor air as it is discharged from the compressor) by a $\Delta T_1$ which is more than 100° F., and gas turbine load combined with ambient temperature can affect compressor discharge temperature at 1FWSP by $\Delta T_3$ which is more than 200° F. FIG. 6 thus shows the importance of providing additional cooling to 1FWSP, as without such cooling, temperatures could easily exceed 1000° F.

In still another embodiment, SMA material can be used to control cross shank leakage.

Figure 7:
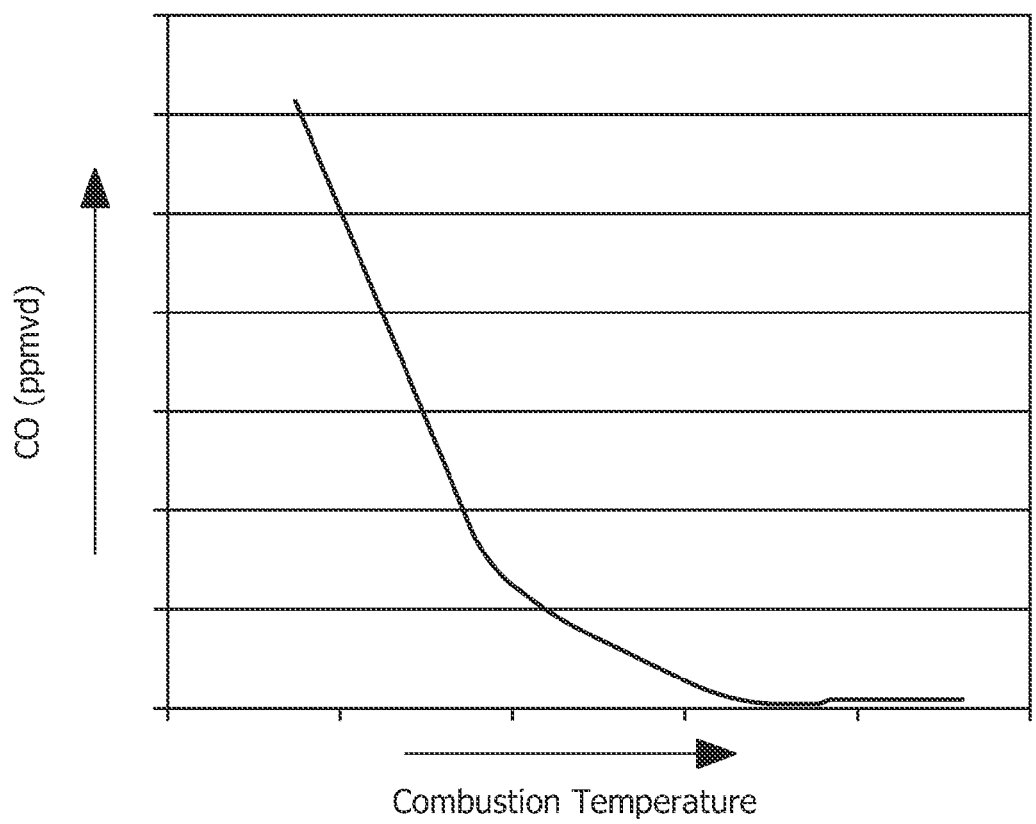
FIG. 7 depicts the increase in CO with gas turbine turndown.
Figure 8:
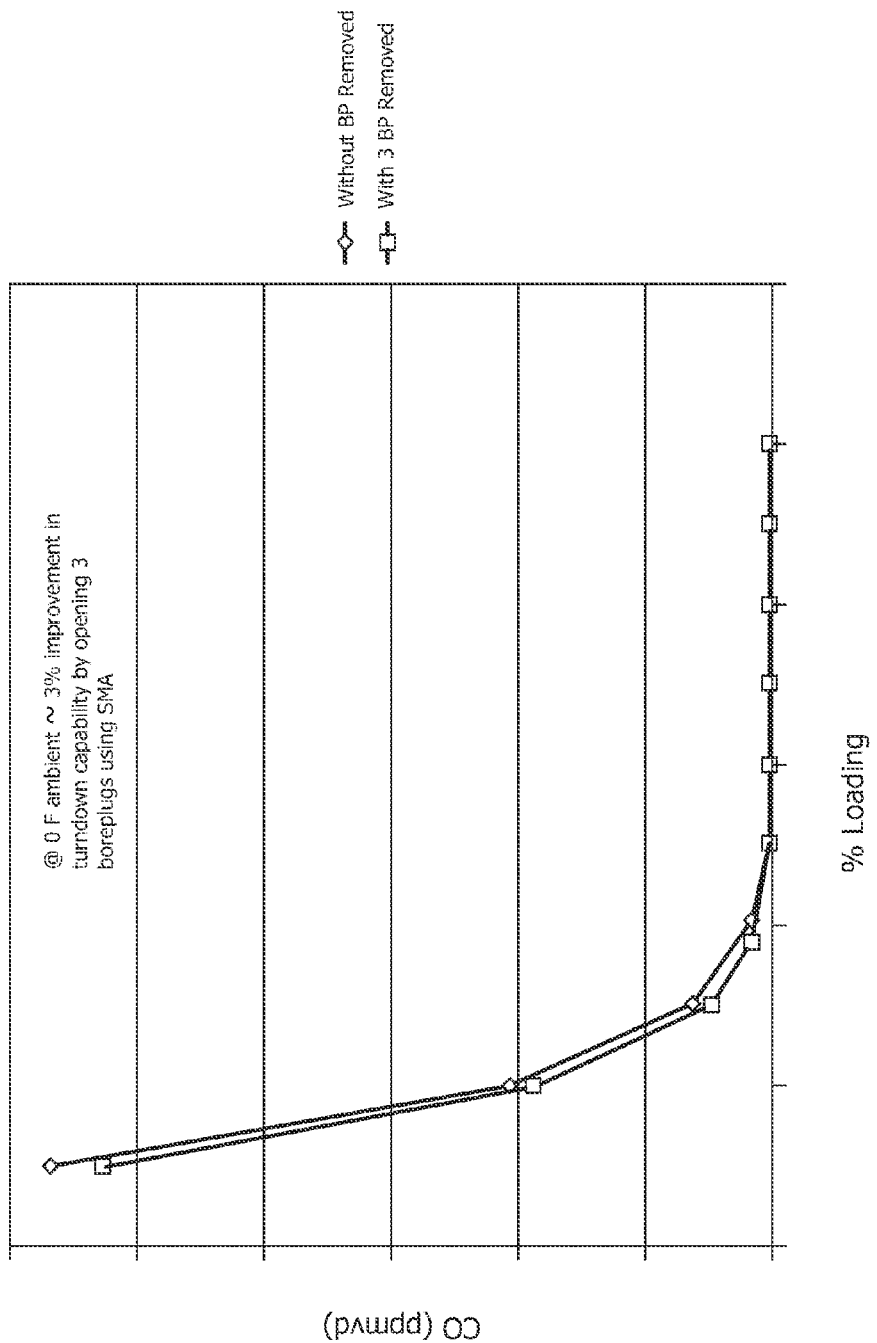
FIG. 8 represents the improvement due to reduction in CO emissions at 0° ambient temperature due to opening of three boreplugs.

In yet another embodiment, SMA material can be used in boreplugs to improve the turndown capability of a gas turbine engine. At lower load levels during turndown, the amount of fuel consumed is decreased and the amount of air provided for combustion also changes, to maintain the emissions from combustion, specifically $NO_x$ and CO, within prescribed, compliance limits. As the ambient temperature falls, the compressor discharge temperature also decreases, which may adversely affect emissions, and the minimum load for CO compliance rises steeply, the ambient air temperature being directly related to the compressor discharge temperature of the air. This is shown in FIG. 7 which is a plot of CO vs. combustion temperature. However, emissions can be improved by modulating the flow of compressor discharge air through boreholes 40 using SMA boreplugs 42. At high compressor discharge temperatures, which occur at high ambient temperatures, the SMA boreplug may be provided in a heat treatment condition such that the bore opening is smaller. At low compressor discharge temperatures, which occur at low ambient temperatures, the SMA boreplug, due to its heat treatment condition, reacts to the low temperature, by providing an enlarged bore opening. This results in a reduction of air flow to the combustor and an increase in the cooling flow air based on the compressor discharge temperature, which is related to the ambient temperature. So for example, boreplugs may be completely closed or partially closed at a high compressor discharge temperature, for example about 750° F., and may be completely open at a low compressor discharge temperature, for example about 620° F. The SMA boreplugs may also undergo a gradual change in the opening as the temperature varies between the extremes. Thus, boreplugs 42 may be completely closed at 750° F., completely open at 620° F. and open to bypass about 50% of air midway between these extreme temperatures. Alternatively, boreplugs 42 may completely open to bypass maximum air when a predetermined temperature is reached, for example 650° F. The operation of the boreplugs 42 in this manner has been found to reduce the minimum emission compliant load by up to 3% at 0° F. ambient as indicated in FIG. 8. FIG. 8 represents the measured reduction in gas turbine turndown capability of 3% at 0° F. (ambient temperature). This reduction means the gas turbine can run with an emission compliant load of 37% rather than 40% load with a few (3 boreplugs) in the open configuration.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cooling arrangement for a gas turbine engine, comprising:
   a discharge channel for air flow from a compressor;
   a first cooling channel;
   a compressor discharge case forming a boundary between the discharge channel and the first cooling channel;
   a plurality of apertures through the compressor discharge case providing communication for flow of air between the discharge channel and the first cooling channel; and
   a plurality of boreplugs positioned in at least some of the plurality of apertures that regulate the flow of air between the discharge channel and the first cooling channel through the at least some of the plurality of apertures by deforming in response to a temperature change of discharge air flowing through the discharge channel of the gas turbine engine;
   wherein the boreplugs comprise shape memory alloys;
   wherein each boreplug comprises a different shape memory alloy, each shape memory alloy assuming a first shape such that each boreplug restricts when the temperature of airflow of the discharge air is below a first preselected temperature so that little or no air flows through the aperture, and wherein the shape memory alloy assumes a second shape such that each boreplug is open to allow air to flow freely through the aperture when the temperature of airflow of the discharge air is at least at a second preselected temperature, the first preselected temperatures and the second preselected temperatures of each of the different shape memory alloys being different, and the second preselected temperature being greater than the first preselected temperature for each of the different shape memory alloys, whereby air flow from the discharge channel into the first cooling channel is modulated over a range of temperatures; and
   wherein each boreplug assumes an intermediate shape between the first shape and the second shape when temperature of airflow of the discharge air is between the first preselected temperature and the second preselected temperature.

2. The cooling arrangement of claim 1 wherein the shape memory alloys are responsive to a temperature experienced by the gas turbine engine.

3. The cooling arrangement of claim 1 wherein the shape memory alloys comprise two way shape memory alloys having the formula $(A_{1-x}PGM_x)_{0.5+y}B_{0.5-y}$ wherein PGM is a platinum group metal selected from the group consisting of Pt, Pd, Rh, Ru, Ir and combinations thereof.

4. The cooling arrangement of claim 3 wherein A is selected from the group consisting of Ni, Al, Nb, Ti, Ta and combinations thereof.

5. The cooling arrangement of claim 4 wherein B is selected from the group consisting of Al, Cr, Hf, Zr, La, Y, Ce, Ti, Mo, W, Nb, Re, Ta, V and combinations thereof.

6. A gas turbine engine, comprising:
   a compressor for compressing air; a combustor for combusting fuel with compressed air; a turbine for generating power; the compressor further including a discharge channel for directing compressed air from the compressor downstream for the combustor and cooling;
   a cooling channel to provide cooling for cooling flow to turbine buckets; a compressor discharge case forming a boundary between the cooling channel and the discharge channel;
   a plurality of apertures in the compressor discharge case providing communication between the flow of air through the discharge channel and the cooling channel; and
   a plurality of restrictor devices positioned in at least some of the plurality of apertures that regulate the flow of air between the discharge channel and the cooling channel through the at least some of the plurality of apertures by deforming in response to a temperature change of discharge air flowing through the discharge channel of the gas turbine engine; and
   wherein the restrictor devices comprise shape memory alloys;
   wherein each restrictor device comprises a different shape memory alloy, each shape memory alloy assuming a first shape and restricts when the temperature of airflow of the discharge air is below a first preselected temperature so that little or no air flows through the aperture, and wherein the shape memory alloy assumes a second shape such that each restrictor device is open to allow air to flow freely through the aperture when the temperature of airflow of the discharge air is at least at a second preselected temperature, the first preselected temperatures and the second preselected temperatures of each of the different shape memory alloys being different, and the second preselected temperature being greater than the first preselected temperature for each of the different shape memory alloys, whereby air flow from the discharge channel into the cooling channel is modulated over a range of temperatures; and
   wherein each restrictor device assumes an intermediate shape between the first shape and the second shape when temperature of airflow of the discharge air is between the first preselected temperature and the second preselected temperature.

7. The gas turbine engine of claim 6 wherein the restrictor devices comprise a plurality of boreplugs positioned in the at least some of the plurality of apertures.

8. The gas turbine engine of claim 6 wherein the shape memory alloys comprise two way memory alloys.

9. The gas turbine engine of claim 8 wherein the two way shape memory alloys have the formula $(A_{1-x}PGM_x)_{0.5+y} B_{0.5-y}$, wherein PGM is a platinum group metal selected from the group consisting of Pt, Pd, Rh, Ru, Ir and combinations thereof.

10. The gas turbine engine of claim 7 wherein the shape memory alloys are responsive to an ambient temperature experienced by the gas turbine engine compressor inlet, wherein air flow temperature in the discharge channel from the compressor is directly related to the ambient temperature at the compressor inlet, wherein the shape memory alloys assume the first shape when the shape memory alloys are in a martensitic state below the first preselected temperature so as to substantially prevent airflow into the cooling channels, and wherein the shape memory alloys assume the second shape when the shape memory alloys are in an austenitic state at or above the second preselected temperature so as to substantially admit airflow into the cooling channels.

11. The gas turbine engine of claim 10 wherein cross shank leakage across bucket shanks is reduced when the shape memory alloys are in the martensitic state below the first preselected temperature thereby preventing airflow into the cooling channel.

* * * * *